(12) United States Patent
Hsu et al.

(10) Patent No.: US 11,174,925 B2
(45) Date of Patent: Nov. 16, 2021

(54) DUAL-SHAFT DRIVING MODULE

(71) Applicant: FIRST DOME CORPORATION, New Taipei (TW)

(72) Inventors: An-Szu Hsu, New Taipei (TW); Hsu-Hung Yao, Taipei (TW); Yi-Cheng Liao, New Taipei (TW)

(73) Assignee: FIRST DOME CORPORATION, New Taipei (TW)

( * ) Notice: Subject to any disclaimer, the term of this patent is extended or adjusted under 35 U.S.C. 154(b) by 1022 days.

(21) Appl. No.: 15/827,657

(22) Filed: Nov. 30, 2017

(65) Prior Publication Data
US 2018/0355961 A1 Dec. 13, 2018

(30) Foreign Application Priority Data

Jun. 7, 2017 (TW) .................................. 106208177

(51) Int. Cl.
*F16H 25/12* (2006.01)
*F16H 37/06* (2006.01)
*F16H 15/36* (2006.01)
*F16H 3/12* (2006.01)
*G06F 1/16* (2006.01)
*F16F 15/14* (2006.01)

(52) U.S. Cl.
CPC ............. *F16H 37/065* (2013.01); *F16H 3/12* (2013.01); *F16H 15/36* (2013.01); *G06F 1/1681* (2013.01); *F16F 15/145* (2013.01); *F16H 25/12* (2013.01)

(58) Field of Classification Search
CPC .......... F16H 25/06; F16H 25/08; F16H 29/12; F16H 37/065; F16H 25/12; H05K 5/0226; G06F 1/1681; E05D 3/06

USPC .............................................. 74/22 R, 57, 63
See application file for complete search history.

(56) References Cited

U.S. PATENT DOCUMENTS

| | | | | |
|---|---|---|---|---|
| 3,792,616 A | * | 2/1974 | Wentzel | F16H 25/12 74/57 |
| 4,395,924 A | * | 8/1983 | Callahan | F16C 1/02 74/424.74 |
| 8,918,960 B2 | * | 12/2014 | Hsu | F16H 21/12 16/366 |
| 8,959,720 B2 | * | 2/2015 | Hsu | G06F 1/1681 16/366 |
| 9,104,381 B2 | * | 8/2015 | Kuramochi | G06F 1/1681 |

(Continued)

*Primary Examiner* — William C Joyce
(74) *Attorney, Agent, or Firm* — Li & Cai Intellectual Property (USA) Office

(57) ABSTRACT

A dual-shaft driving module includes two shafts and a synchronizing block sandwiched between the two shafts. The two shafts are substantially parallel to each other and are substantially in a mirror symmetrical arrangement. Each shaft has two spiral grooves recessed on an outer surface thereof, and each spiral groove has a spiral angle within a range of 40 degrees to 60 degrees. The synchronizing block includes two concave surfaces arranged on two opposite sides thereof and four driving portions respectively protruding from the two concave surfaces. The two concave surfaces respectively face the two shafts, and each concave surface accommodates a part of the corresponding shaft. The four driving portions are respectively inserted into the four spiral grooves. When one of the two shafts is spun to transmit a force to the synchronizing block, the synchronizing block rotates the other shaft at the same time by the force.

15 Claims, 7 Drawing Sheets

(56) References Cited

U.S. PATENT DOCUMENTS

| | | | |
|---|---|---|---|
| 9,185,815 B2 * | 11/2015 | Hsu | E05D 3/122 |
| 9,265,166 B2 * | 2/2016 | Hsu | H05K 5/0226 |
| 2015/0173218 A1 * | 6/2015 | Hsu | G06F 1/1618 16/366 |
| 2015/0327383 A1 * | 11/2015 | Hsu | G06F 1/1679 16/366 |

* cited by examiner

DUAL-SHAFT DRIVING MODULE

BACKGROUND OF THE INVENTION

1. Field of the Invention

The present disclosure relates to a torsion module; in particular, to a dual-shaft driving module.

2. Description of Related Art

The conventional dual-shaft driving module includes two shafts and a synchronizing mechanism for transmitting a force between the two shafts, and the synchronizing mechanism causes the two shafts to spin at the same time by using a plurality of gears engaged with each other. However, a distance between the two shafts in the conventional dual-shaft driving module is limited to the size and the teeth number of the gears, so that the structure of the conventional dual-shaft driving module is restricted.

SUMMARY OF THE INVENTION

The present disclosure provides a dual-shaft driving module to effectively improve the drawbacks associated with conventional dual-shaft driving modules.

The present disclosure discloses a dual-shaft driving module, which includes two shafts and a synchronizing block. The two shafts are substantially parallel to each other and are substantially in a mirror symmetrical arrangement. Each of the two shafts has two spiral grooves parallel to each other and recessed on an outer surface thereof, and each of the spiral grooves has a spiral angle within a range of 40 degrees to 60 degrees. The synchronizing block includes two concave surfaces arranged on two opposite sides thereof and four driving portions respectively protruding from the two concave surfaces. The synchronizing block is sandwiched between the two shafts, the two concave surfaces respectively face the two shafts, and each of the two concave surfaces accommodates a part of the corresponding shaft. The four driving portions formed on the two concave surfaces are respectively inserted into the four spiral grooves of the two shafts. When one of the two shafts is spun to transmit a force to the synchronizing block, the synchronizing block rotates the other shaft at the same time by the force.

The present disclosure also discloses a dual-shaft driving module, which includes two shafts, a synchronizing block, and two external connecting members. The two shafts are substantially parallel to each other and substantially in a mirror symmetrical arrangement. Each of the two shafts has two spiral grooves parallel to each other and recessed on an outer surface thereof, and each of the spiral grooves has a spiral angle within a range of 40 degrees to 60 degrees. Each of the two shafts has two end segments arranged at two opposite sides thereof. The synchronizing block includes two concave surfaces arranged on two opposite sides thereof and four driving portions respectively protruding from the two concave surfaces. The synchronizing block is sandwiched between the two shafts, the two concave surfaces respectively face the two shafts, and each of the two concave surfaces accommodates a part of the corresponding shaft. The four driving portions formed on the two concave surfaces are respectively inserted into the four spiral grooves of the two shafts. The two external connecting members are respectively fastened to the two end segments arranged on one side of the two shafts for respectively fixing two external objects, and the other two end segments arranged on the other side of the two shafts are suspended. When one of the two shafts is spun to transmit a force to the synchronizing block, the synchronizing block rotates the other shaft at the same time by the force.

In summary, the dual-shaft driving module of the present disclosure adapts the synchronizing block sandwiched between the two shafts to enable the two shafts to rotate at the same time, so that the structure of the dual-shaft driving module of the present disclosure is not limited to the conventional gears. Moreover, reducing the size of the synchronizing block is easier than reducing their respective sizes of the conventional gears, so that a distance between the two shafts of the present disclosure can be reduced for miniaturizing the dual-shaft driving module.

In order to further appreciate the characteristics and technical contents of the present disclosure, references are hereunder made to the detailed descriptions and appended drawings in connection with the present disclosure. However, the appended drawings are merely shown for exemplary purposes, and should not be construed as restricting the scope of the present disclosure.

DETAILED DESCRIPTION OF THE PREFERRED EMBODIMENTS

Reference is made to FIGS. 1 to 8, which illustrate the present disclosure. References are hereunder made to the detailed descriptions and appended drawings in connection with the present disclosure. However, the appended drawings are merely provided for exemplary purposes, and should not be construed as restricting the scope of the present disclosure.

Figure 1:
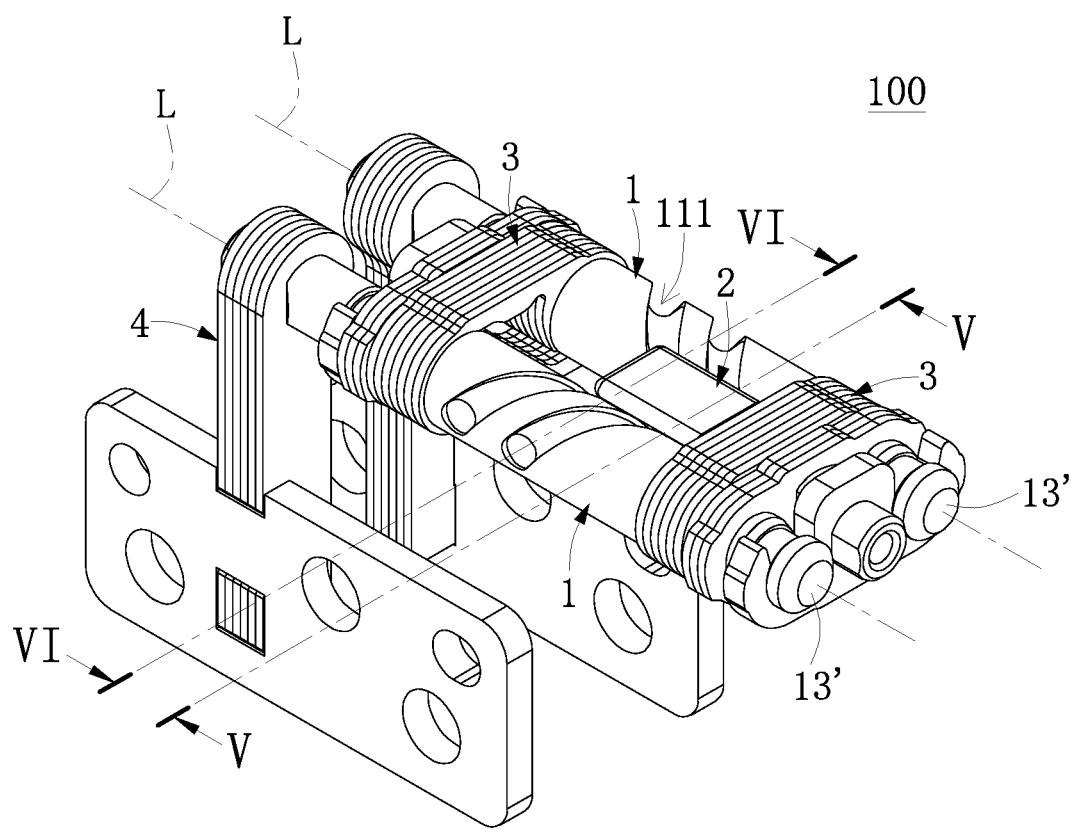
FIG. 1 is a perspective view showing a dual-shaft driving module according to the present disclosure.

As shown in FIG. 1, the present embodiment discloses a dual-shaft driving module 100. The dual-shaft driving module 100 includes two shafts 1, a synchronizing block 2 sandwiched between the two shafts 1, two torsion washer assemblies 3 each sleeved on the two shafts 1, and two external connecting members 4 respectively fastened to the two shafts 1. The following description discloses the structure and connection of the components of the dual-shaft driving module 100.

Figure 2:
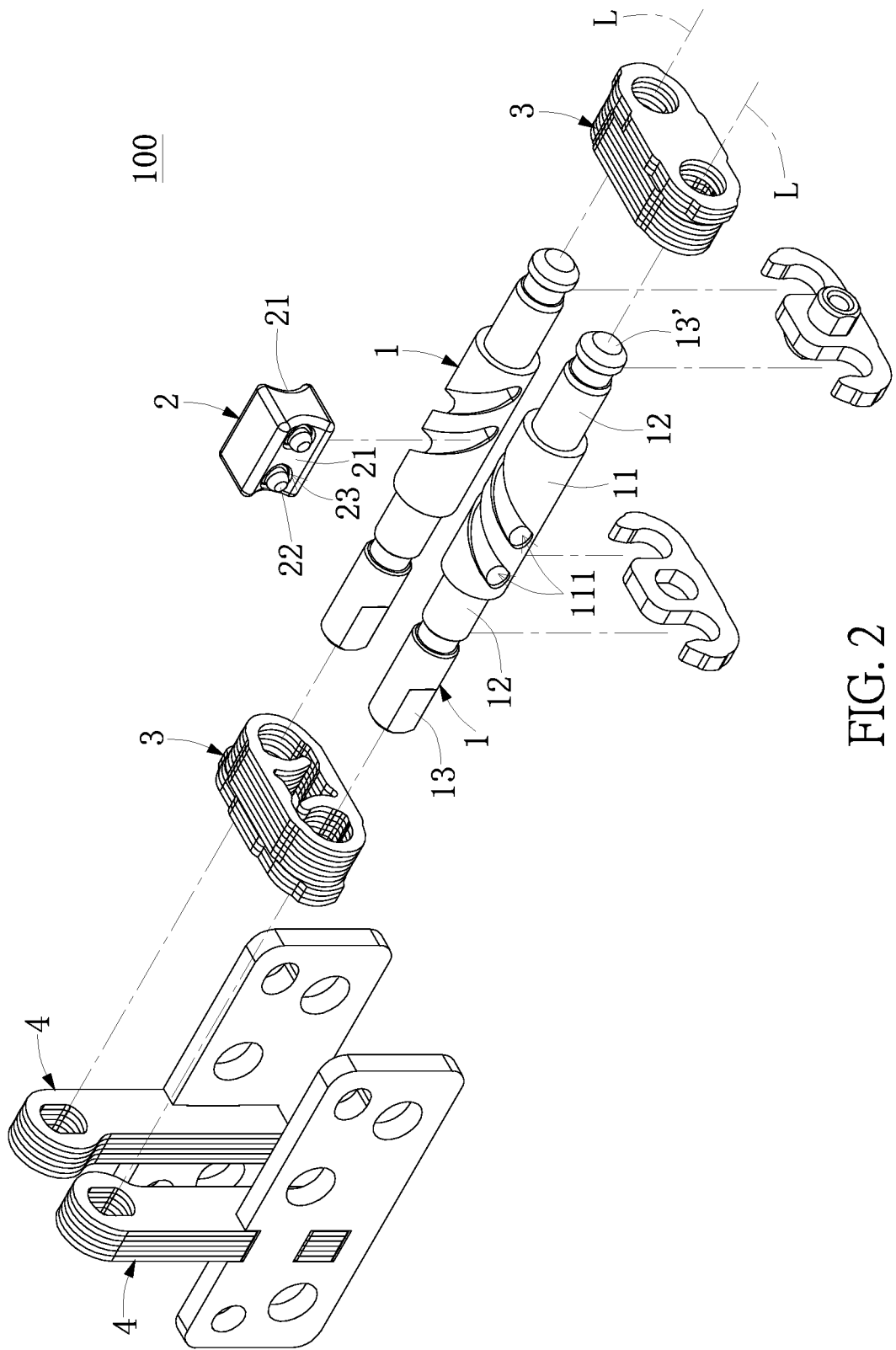
FIG. 2 is an exploded view of FIG. 1.
Figure 3:
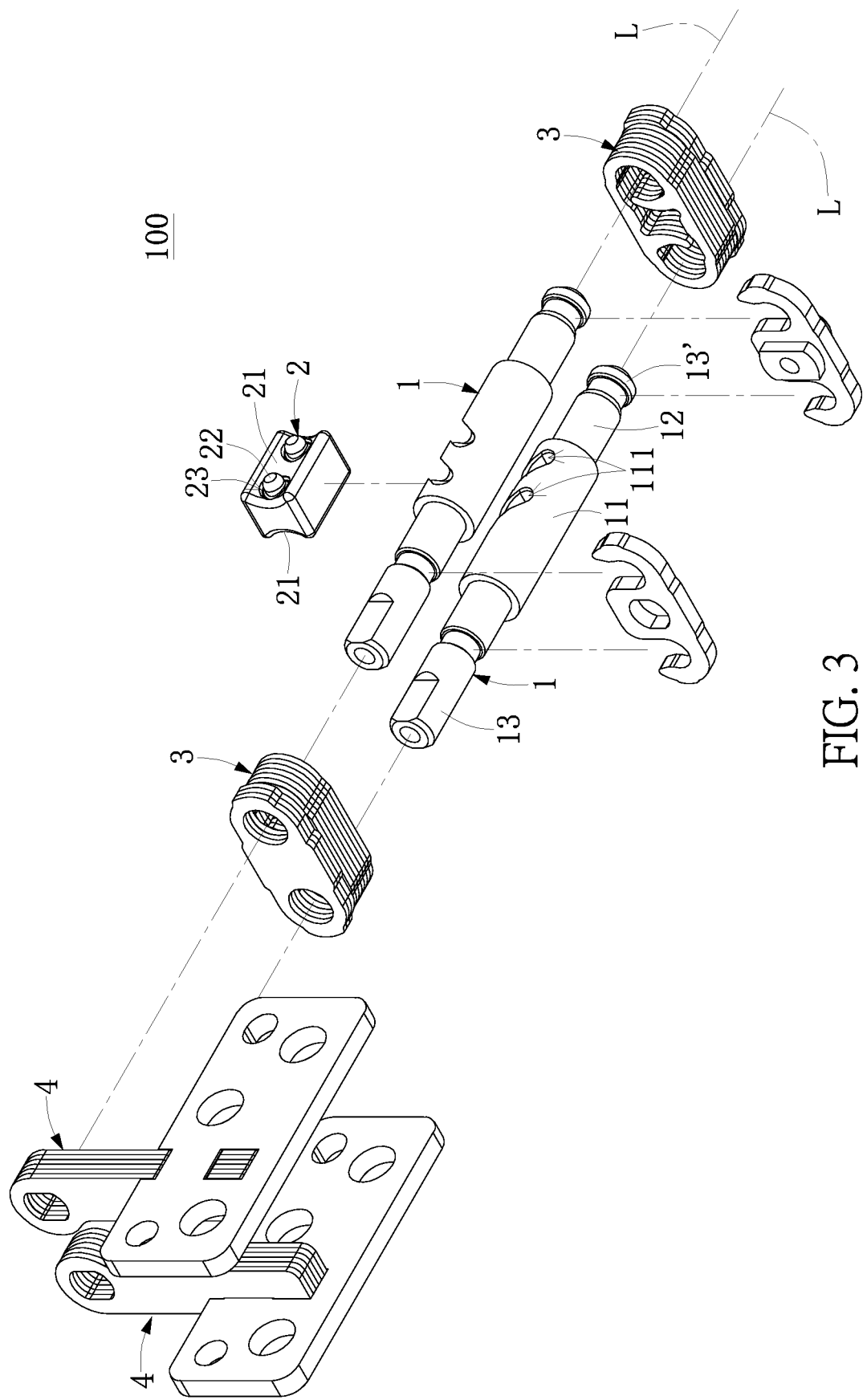
FIG. 3 is an exploded view of FIG. 1 from another perspective.

As shown in FIGS. 2 and 3, the two shafts 1 are substantially parallel to each other, that is to say, the central axis L of one of the two shafts 1 is parallel to the central axis L of the other shaft 1. As the two shafts 1 in the present embodiment are in a mirror symmetrical arrangement, the following description discloses the structure of one of the two shafts 1 for the sake of brevity.

The shaft 1 includes a driving segment 11, two torsion segments 12 respectively arranged at two opposite outer sides of the driving segment 11 (i.e., the left side and the right side of the driving segment 11 as shown in FIG. 2), two end segments 13, 13' respectively arranged at two opposite outer sides of the two torsion segments 12 (i.e., the left side and the right side of the two torsion segments 12 as shown in FIG. 2). The driving segment 11 is substantially in a cylindrical structure, and a maximum outer diameter of the driving segment 11 is a maximum outer diameter of the shaft 1.

Figure 4:
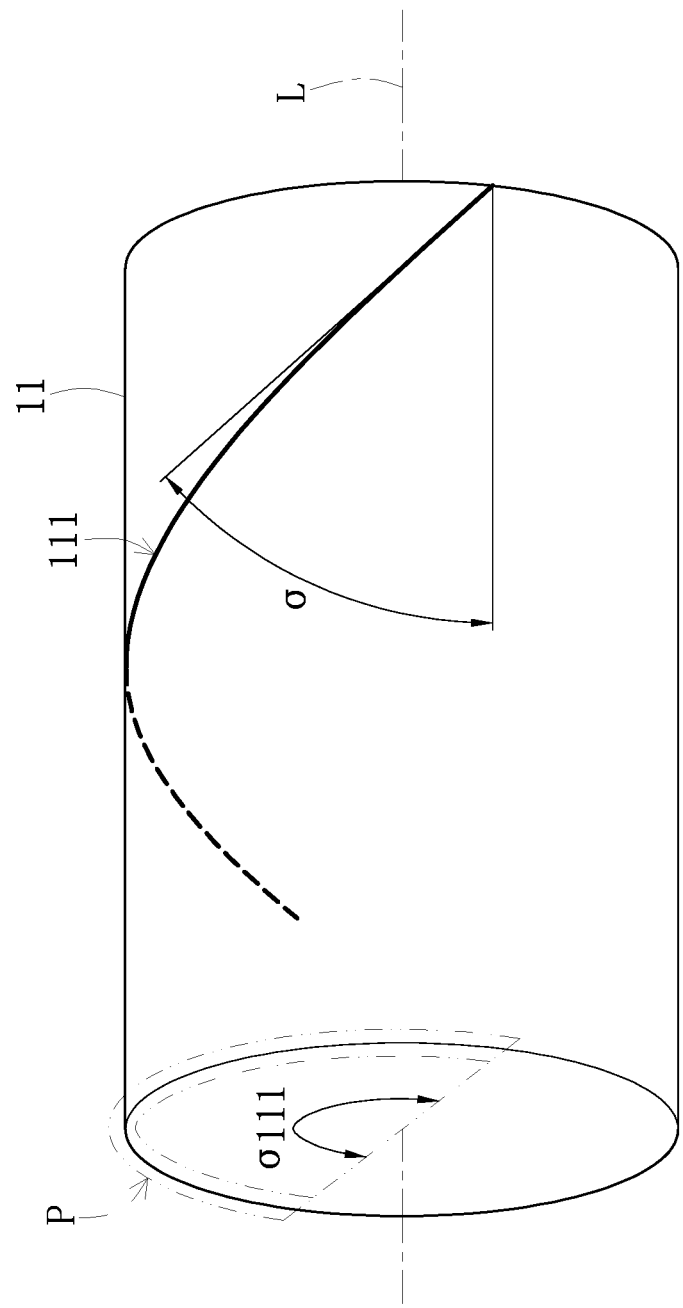
FIG. 4 is a schematic view showing a driving segment of a shaft of FIG. 2.
Figure 5:
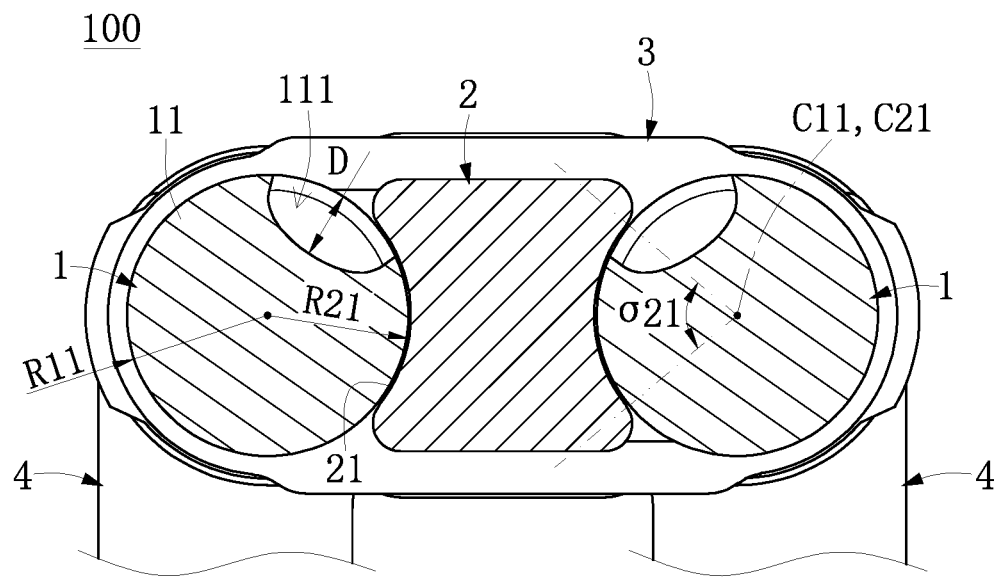
FIG. 5 is a cross-sectional view taken along a cross-sectional line V-V of FIG. 1.

The shaft 1 has two spiral grooves 111 parallel to each other and is recessed on an outer surface of the driving segment 11. Each of the spiral grooves 111 has a spiral angle σ (as shown in FIG. 4) within a range of 40 degrees to 60 degrees. The spiral angle σ in the present embodiment is 45 degrees, but the present disclosure is not limited thereto. A depth D of each of the spiral grooves 111 (as shown in FIG. 5) is ¼~⅐ of the maximum outer diameter of the driving segment 11, and the depth D of each of the spiral grooves 111 in the present embodiment is ⅙ of the maximum outer diameter of the driving segment 11. Moreover, a projecting region P (as shown in FIG. 4), which is defined by orthogonally projecting each of the spiral grooves 111 onto a plane in a longitudinal direction of the shaft 1 (i.e., the central axis L of the shaft 1), is in an arc shape and has a central angle σ111 smaller than or equal to 180 degrees. The central angle σ111 in the present embodiment is 180 degrees, but the present disclosure is not limited thereto.

As shown in FIGS. 2 and 3, each of the torsion segments 12 in the present embodiment is substantially in a cylindrical structure and has an outer diameter smaller than the maximum outer diameter of the driving segment 11. Moreover, one of the two end segments 13, 13' (i.e., the end segment 13) has a non-circle cross-section for inserting into and fixing on one of the two external connecting members 4.

The following description discloses the connection between the two shafts 1 and the other components. The two torsion segments 12 of each of the two shafts 1 are respectively inserted into the two torsion washer assemblies 3, and the two torsion washer assemblies 3 are respectively arranged at two opposite outer sides of the two driving segments 11. That is to say, each of the two torsion washer assemblies 3 is sleeved on the two adjacent torsion segments 12 arranged on the same side of the two shafts 1 (i.e., the left side of the two shafts 1 as shown in FIG. 2), and the friction between the two torsion washer assemblies 3 and the torsion segments 12 can provide torsion to the dual-shaft driving module 100. The relative position of the two shafts 1 can be effectively maintained by the two torsion washer assemblies 3.

Moreover, the two external connecting members 4 are respectively fastened to the two end segments 13 arranged on one side of the two shafts 1 (i.e., the left side of the two shafts 1 as shown in FIG. 2) for respectively fixing two external objects (e.g., a display and a keyboard), and the other two end segments 13' arranged on the other side of the two shafts 1 (i.e., the right side of the two shafts 1 as shown in FIG. 2) are suspended. It should be noted that the end segment 13' of each of the two shafts 1 in the present embodiment is not used to fix any external connecting member 4.

Figure 6:
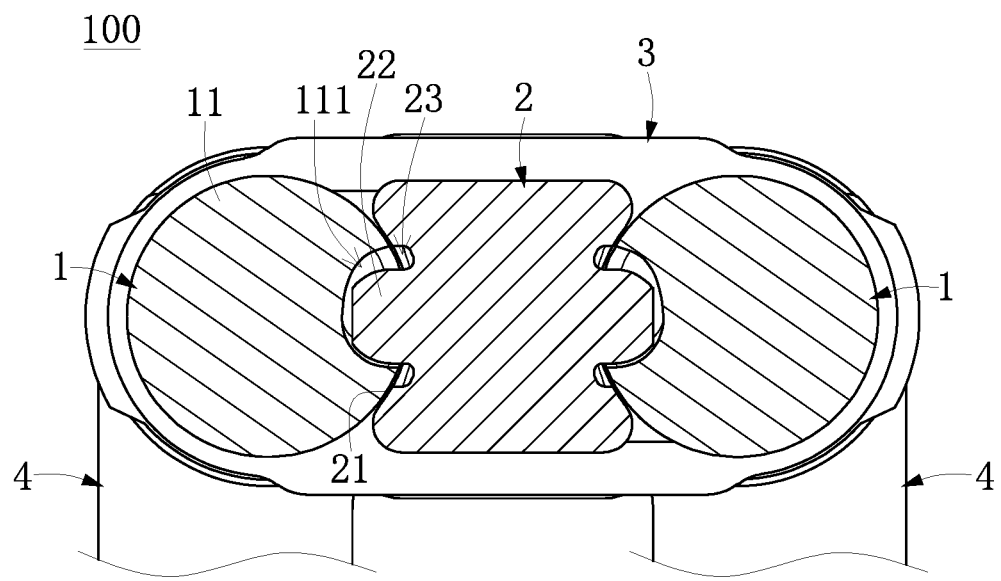
FIG. 6 is a cross-sectional view taken along a cross-sectional line VI-VI of FIG. 1.
Figure 7:
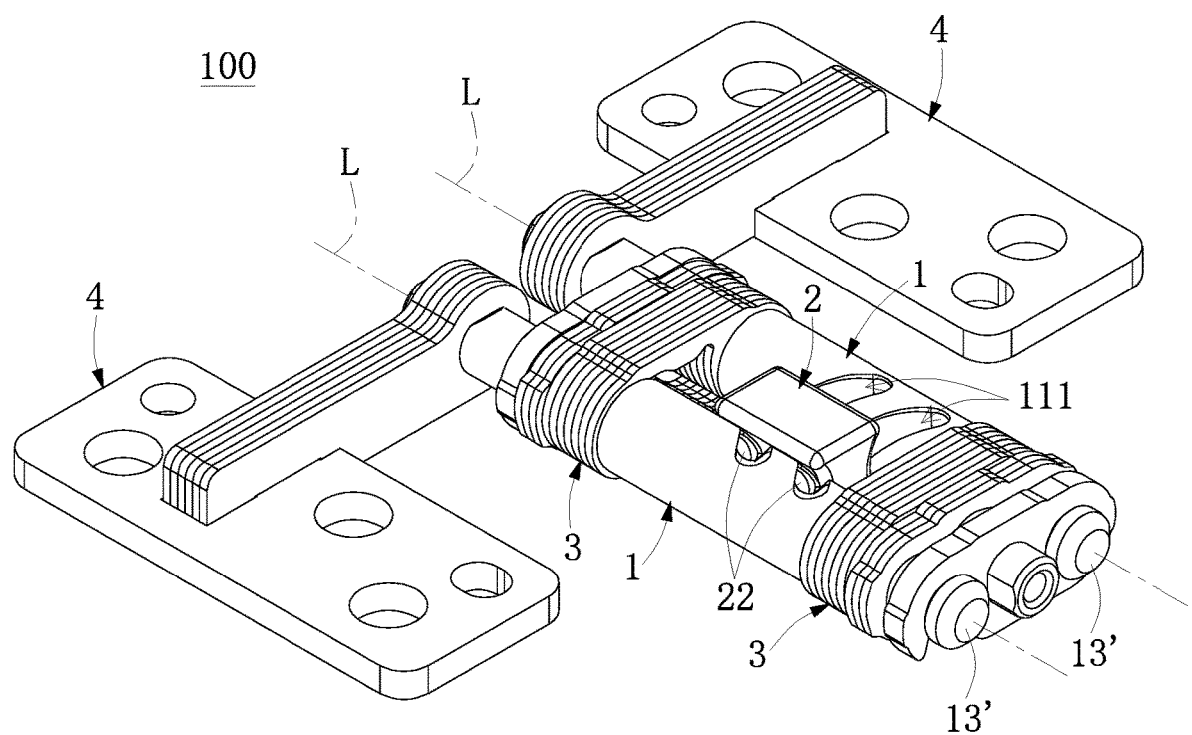
FIG. 7 is a perspective view showing the dual-shaft driving module when two external connecting members are rotated at 180 degrees.
Figure 8:
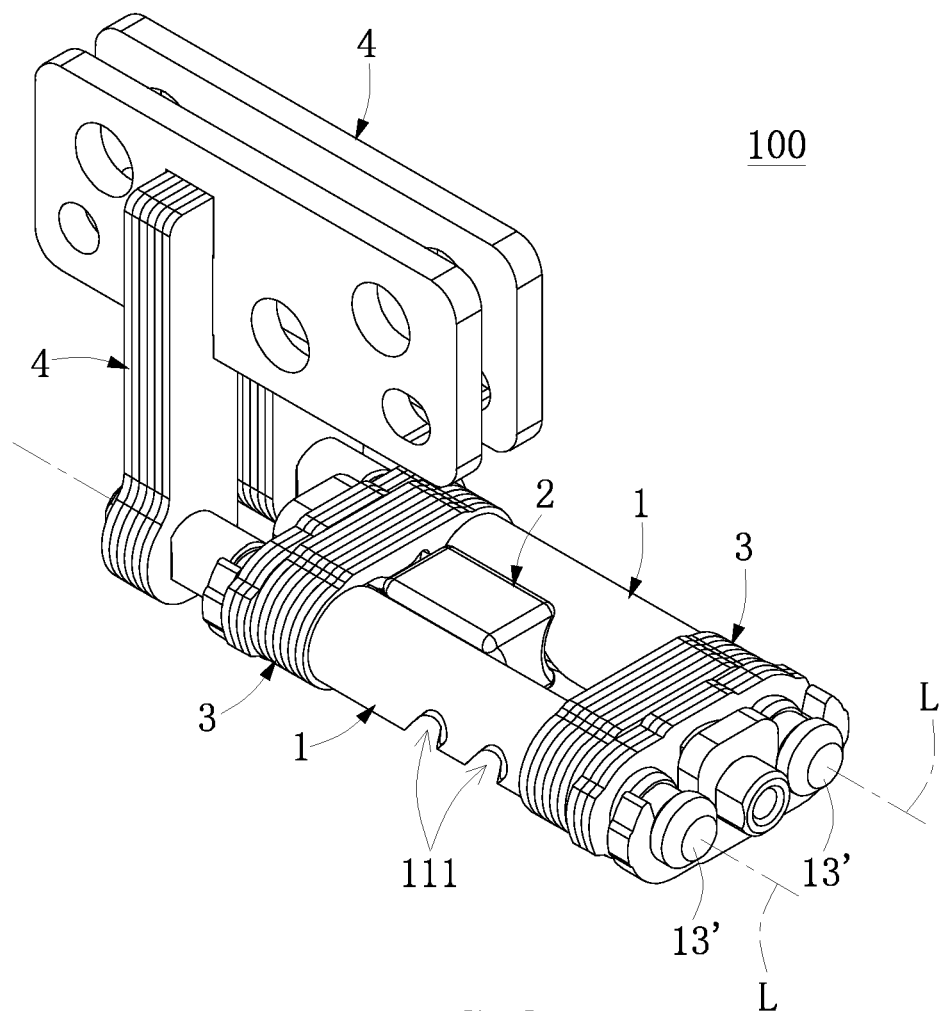
FIG. 8 is a perspective view showing the dual-shaft driving module when two external connecting members are rotated at 360 degrees.

As shown in FIGS. 2, 3 and 6, the synchronizing block 2 includes two concave surfaces 21 arranged on two opposite sides thereof (i.e., the front side and the rear side of the synchronizing block 2 as shown in FIG. 2), four driving portions 22 respectively protruding from the two concave surfaces 21, and four annular concavities 22 respectively recessed on the two concave surfaces 21 and respectively arranged around the four driving portions 22. The four driving portions 22 of the synchronizing block 2 in the present embodiment are substantially in a mirror symmetrical arrangement, but the present disclosure is not limited thereto.

Specifically, the synchronizing block 2 is sandwiched between the two shafts 1, and the two concave surfaces 21 respectively face the two driving segments 11 of the two shafts 1. Each of the two concave surfaces 21 accommodates a part of the corresponding shaft 1, and the four driving portions 22 formed on the two concave surfaces 21 are respectively inserted into the four spiral grooves 111 of the two shafts 1.

Moreover, in order to improve the stability of the connection between the two shafts 1 and the synchronizing block 2, the present embodiment provides the following structural design of the two shafts 1 and the synchronizing block 2.

Specifically, in a cross-section of the two shafts 1 and the synchronizing block 2 (as shown in FIG. 5, which is perpendicular to the central axis L of each of the two shafts 1), each of the two driving segments 11 is substantially in a circle shape and each of the two concave surfaces 21 is substantially in an arc shape, two circle centers C21 of the two concave surfaces 21 are respectively arranged at two circle centers C11 of the two driving segments 11, and a radius R21 of each of the two concave surface 21 is substantially equal to a radius R11 of the corresponding driving segment 11. Moreover, a central angle σ21 of each of the two concave surfaces 21 is preferably within a range of 80 degrees to 100 degrees (i.e., the central angle σ21 is 90 degrees in the present embodiment), but the present disclosure is not limited thereto.

The structure of the dual-shaft driving module 100 has been disclosed in the above description, and the following description discloses the operation of the dual-shaft driving module 100. As shown in FIGS. 1, 6, 7 and 8, when one of the two shafts 1 is spun to transmit a force to the synchronizing block 2, the synchronizing block 2 rotates the other shaft 1 at the same time by the force. Specifically, when one of the two shafts 1 is spun (e.g., the left shaft 1 as shown in FIG. 1), the two spiral grooves 111 of the spun shaft 1 respectively drive the corresponding two driving portions 22 (e.g., the left two driving portions 22) to move therein, so that the other two driving portions 22 (e.g., the right two driving portions 22) are moved to respectively press the corresponding two spiral grooves 111 for rotating the other shaft 1 (e.g., the right shaft 1) at the same time. Moreover, when the two shafts 1 are spun, the synchronizing block 2 moves straightly in a direction parallel to the central axis L of each of the two shafts 1.

[The Effects of the Above Embodiment]

In summary, the dual-shaft driving module 100 of the present disclosure adapts the synchronizing block 2 sandwiched between the two shafts 1 to enable the two shafts 1 to rotate at the same time, so that the structure of the dual-shaft driving module 100 of the present disclosure is not limited to the conventional gears. Moreover, reducing the size of the synchronizing block 2 is easier than reducing their respective sizes of the conventional gears, so that a distance between the two shafts 1 of the present disclosure can be reduced for miniaturizing the dual-shaft driving module 100.

In addition, each of the components of the dual-shaft driving module 100 in the present disclosure is provided with certain structural features to improve the stability of the connection between the two shafts 1 and the synchronizing block 2. For example, each of the two shafts 1 is cooperated with the synchronizing block 2 by using the two spiral grooves 111 to respectively guide the two driving portions 22, so that the connection between each of the two shafts 1 and the synchronizing block 2 can be operated smoothly. Thus, the synchronizing block 2 is not only firmly sandwiched between the two shafts 1, but also smoothly moves along the two shafts 1.

The descriptions illustrated supra set forth simply the preferred embodiments of the present disclosure; however, the characteristics of the present disclosure are by no means restricted thereto. All changes, alterations, or modifications conveniently considered by those skilled in the art are deemed to be encompassed within the scope of the present disclosure delineated by the following claims.

What is claimed is:

1. A dual-shaft driving module, comprising:
    two shafts substantially parallel to each other and substantially in a mirror symmetrical arrangement, wherein each of the two shafts has two spiral grooves parallel to each other and recessed on an outer surface thereof, and each of the spiral grooves has a spiral angle within a range of 40 degrees to 60 degrees; and
    a synchronizing block including two concave surfaces arranged on two opposite sides thereof and four driving portions respectively protruding from the two concave surfaces, wherein the synchronizing block is sandwiched between the two shafts, the two concave surfaces respectively face the two shafts, each of the two concave surfaces accommodates a part of the corresponding shaft, and the four driving portions formed on the two concave surfaces are respectively inserted into the four spiral grooves of the two shafts;
    wherein when one of the two shafts is spun to transmit a force to the synchronizing block, the synchronizing block rotates the other shaft at the same time by the force,
    wherein each of the two shafts includes a driving segment having the two spiral grooves, two torsion segments respectively arranged at two opposite outer sides of the driving segment, and two end segments respectively arranged at two opposite outer sides of the two torsion segments,
    wherein the dual-shaft driving module further includes two torsion washer assemblies, wherein the two torsion segments of each of the two shafts are respectively inserted into the two torsion washer assemblies, and the two torsion washer assemblies are respectively arranged at two opposite outer sides of the two driving segments,
    wherein the synchronizing block has four annular concavities respectively recessed on the two concave surfaces and respectively arranged around the four driving portions.

2. The dual-shat driving module as claimed in claim 1, wherein in each of the two shafts, a depth of each of the two spiral grooves is ¼~⅐ of a maximum outer diameter of the driving segment.

3. The dual-shat driving module as claimed in claim 2, wherein in a cross-section of the two shafts and the synchronizing block, each of the two driving segments is substantially in a circle shape, each of the two concave surfaces is substantially in an arc shape, and two circle centers of the two concave surfaces are respectively arranged at two circle centers of the two driving segments.

4. The dual-shat driving module as claimed in claim 2, wherein in a cross-section of the two shafts and the synchronizing block, each of the two driving segments is substantially in a circle shape, each of the two concave surfaces is substantially in an arc shape, and a radius of each of the two concave surfaces is substantially equal to that of each of the two driving segments.

5. The dual-shat driving module as claimed in claim 1, wherein the four driving portions of the synchronizing block are substantially in a mirror symmetrical arrangement.

6. The dual-shat driving module as claimed in claim 1, wherein in each of the two shafts, a projecting region defined by orthogonally projecting each of the two spiral grooves onto a plane in a longitudinal direction of the corresponding shaft is in an arc shape and has a central angle smaller than or equal to 180 degrees.

7. The dual-shat driving module as claimed in claim 1, wherein when the two shafts are spun, the synchronizing block moves straightly in a direction parallel to a central axis of each of the two shafts.

8. A dual-shaft driving module, comprising:
    two shafts substantially parallel to each other and substantially in a mirror symmetrical arrangement, wherein each of the two shafts has two spiral grooves parallel to each other and recessed on an outer surface thereof, and each of the spiral grooves has a spiral angle within a range of 40 degrees to 60 degrees, wherein each of the two shafts has two end segments arranged at two opposite sides thereof;
    a synchronizing block including two concave surfaces arranged on two opposite sides thereof and four driving portions respectively protruding from the two concave surfaces, wherein the synchronizing block is sandwiched between the two shafts, the two concave surfaces respectively face the two shafts, each of the two concave surfaces accommodates a part of the corresponding shaft, and the four driving portions formed on the two concave surfaces are respectively inserted into the four spiral grooves of the two shafts; and
    two external connecting members respectively fastened to the two end segments arranged on one side of the two shafts for respectively fixing two external objects, and the other two end segments arranged on the other side of the two shafts are suspended;
    wherein when one of the two shafts is spun to transmit a force to the synchronizing block, the synchronizing block rotates the other shaft at the same time by the force,
    wherein each of the two shafts includes a driving segment having the two spiral grooves, two torsion segments respectively arranged at two opposite outer sides of the driving segment, and two end segments respectively arranged at two opposite outer sides of the two torsion segments,
    wherein the dual-shaft driving module further includes two torsion washer assemblies, wherein the two torsion segments of each of the two shafts are respectively inserted into the two torsion washer assemblies, and the two torsion washer assemblies are respectively arranged at two opposite outer sides of the two driving segments,
    wherein the synchronizing block has four annular concavities respectively recessed on the two concaving surfaces and respectively arranged around the four driving portions.

9. The dual-shat driving module as claimed in claim 8, wherein in each of the two shafts, a depth of each of the two spiral grooves is ¼~⅐ of a maximum outer diameter of the driving segment.

10. The dual-shat driving module as claimed in claim 9, wherein in a cross-section of the two shafts and the synchronizing block, each of the two driving segments is substantially in a circle shape, each of the two concave surfaces is substantially in an arc shape, and two circle centers of the two concave surfaces are respectively arranged at two circle centers of the two driving segments.

11. The dual-shat driving module as claimed in claim 9, wherein in a cross-section of the two shafts and the synchronizing block, each of the two driving segments is substantially in a circle shape, each of the two concave surfaces is substantially in an arc shape, and a radius of each of the two concave surfaces is substantially equal to that of each of the two driving segments.

12. The dual-shat driving module as claimed in claim 8, wherein the four driving portions of the synchronizing block are substantially in a mirror symmetrical arrangement.

13. The dual-shat driving module as claimed in claim 8, wherein in each of the two shafts, a projecting region defined by orthogonally projecting each of the two spiral grooves onto a plane in a longitudinal direction of the corresponding shaft is in an arc shape and has a central angle smaller than or equal to 180 degrees.

14. The dual-shat driving module as claimed in claim 8, wherein when the two shafts are spun, the synchronizing block moves straightly in a direction parallel to a central axis of each of the two shafts.

15. A dual-shaft driving module, comprising:
two shafts substantially parallel to each other and substantially in a mirror symmetrical arrangement, wherein each of the two shafts has two spiral grooves parallel to each other and recessed on an outer surface thereof, and each of the spiral grooves has a spiral angle within a range of 40 degrees to 60 degrees; and
a synchronizing block including two concave surfaces arranged on two opposite sides thereof and four driving portions respectively protruding from the two concave surfaces, wherein the synchronizing block is sandwiched between the two shafts, the two concave surfaces respectively face the two shafts, each of the two concave surfaces accommodates a part of the corresponding shaft, and the four driving portions formed on the two concave surfaces are respectively inserted into the four spiral grooves of the two shafts;
wherein when one of the two shafts is spun to transmit a force to the synchronizing block, the synchronizing block rotates the other shaft at the same time by the force,
wherein the synchronizing block has four annular concavities respectively recessed on the two concave surfaces and respectively arranged around the four driving portions.

* * * * *